US010769521B1

(12) United States Patent
Yu et al.

(10) Patent No.: US 10,769,521 B1
(45) Date of Patent: Sep. 8, 2020

(54) PROCESSING LOOPS IN COMPUTATIONAL GRAPHS

(71) Applicant: Google LLC, Mountain View, CA (US)

(72) Inventors: Yuan Yu, Cupertino, CA (US); Jeffrey Adgate Dean, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 697 days.

(21) Appl. No.: 15/346,626

(22) Filed: Nov. 8, 2016

Related U.S. Application Data

(60) Provisional application No. 62/253,075, filed on Nov. 9, 2015.

(51) Int. Cl.
*G06N 3/08* (2006.01)
*G06N 3/04* (2006.01)

(52) U.S. Cl.
CPC ............. *G06N 3/08* (2013.01); *G06N 3/0445* (2013.01)

(58) Field of Classification Search
CPC ........ G06N 3/08; G06N 3/0445; G06N 20/00; G06N 3/04; G06N 3/0454; G06N 3/082
See application file for complete search history.

(56) References Cited

U.S. PATENT DOCUMENTS

| 7,299,458 | B2 | 11/2007 | Hammes | |
|---|---|---|---|---|
| 8,631,094 | B1 * | 1/2014 | Alpert | G06F 16/9024 709/219 |
| 8,826,255 | B1 | 9/2014 | Avadhanula et al. | |
| 9,424,079 | B2 * | 8/2016 | Rossbach | G06F 9/4843 |
| 10,282,228 | B2 * | 5/2019 | Vermeulen | G06F 9/466 |
| 2015/0227582 | A1 * | 8/2015 | Gu | G06F 16/9024 707/713 |

OTHER PUBLICATIONS

Kröse, Ben, et al. "An introduction to neural networks." (1993). (Year: 1993).*
Abadi et al., "TensorFlow: Large-Scale Machine Learning on Heterogeneous Distributed Systems," (Nov. 9, 2015) (retrieved from http://download.tensorflow.org/paper/whitepaper2015.pdf), 19 pages.

* cited by examiner

*Primary Examiner* — Vincent Gonzales
*Assistant Examiner* — Kevin W Figueroa
(74) *Attorney, Agent, or Firm* — Fish & Richardson P.C.

(57) ABSTRACT

Systems and methods for processing loops in computational graphs representing machine learning models are disclosed. An example method begins with obtaining data representing a computational graph. Data identifying an allocation of the computational graph across devices is obtained. Additionally, one or more nodes in the computational graph that represent a respective control flow statement are identified. For each identified node, a structure of nodes and edges that represents an operation that provides a current state of recursion or iteration in the respective control flow statement is generated. This structure is inserted into the computational graph and the allocation of nodes to devices is modified to assign the structure to a device.

15 Claims, 9 Drawing Sheets

400

```
┌─────────────────────────────────────────────────────────────────────┐
│ OBTAIN DATA REPRESENTING A COMPUTATIONAL GRAPH COMPRISING A PLURALITY OF │
│                  NODES AND DIRECTED EDGES                           │
│                                                                 402 │
└─────────────────────────────────────────────────────────────────────┘
                                  │
                                  ▼
┌─────────────────────────────────────────────────────────────────────┐
│ OBTAIN DATA IDENTIFYING AN ALLOCATION OF THE COMPUTATIONAL GRAPH ACROSS A │
│                        PLURALITY OF DEVICES                         │
│                                                                 404 │
└─────────────────────────────────────────────────────────────────────┘
                                  │
                                  ▼
┌─────────────────────────────────────────────────────────────────────┐
│ IDENTIFY SETS OF NODES THAT REPRESENT CONTROL FLOW STATEMENTS AND   │
│ INCLUDE (I) FIRST NODES THAT REPRESENT CONDITIONALLY EXECUTED OPERATIONS, │
│ AND (II) SECOND NODES ASSIGNED TO ANOTHER DEVICE THAT REPRESENT     │
│ OPERATIONS THAT CONTROL EXECUTION OF FIRST NODE OPERATIONS      406 │
└─────────────────────────────────────────────────────────────────────┘
                                  │
                                  ▼
┌─────────────────────────────────────────────────────────────────────┐
│ GENERATE A STRUCTURE OF NODES AND DIRECTED EDGES THAT REPRESENTS AN │
│ OPERATION THAT PROVIDES, AS OUTPUT, A CURRENT STATE OF RECURSION OR │
│          ITERATION IN THE CONTROL FLOW STATEMENT                    │
│                                                                 408 │
└─────────────────────────────────────────────────────────────────────┘
                                  │
                                  ▼
┌─────────────────────────────────────────────────────────────────────┐
│ INSERT THE STRUCTURE BETWEEN THE ONE OR MORE FIRST NODES AND ONE OR │
│                       MORE SECOND NODES                             │
│                                                                 410 │
└─────────────────────────────────────────────────────────────────────┘
                                  │
                                  ▼
┌─────────────────────────────────────────────────────────────────────┐
│ MODIFY THE ALLOCATION TO ASSIGN THE STRUCTURE TO THE SAME DEVICE AS THE │
│                    ONE OR MORE FIRST NODES                          │
│                                                                 412 │
└─────────────────────────────────────────────────────────────────────┘
```

FIG. 4

PROCESSING LOOPS IN COMPUTATIONAL GRAPHS

CROSS-REFERENCE TO RELATED APPLICATION

This application claims the benefit under 35 U.S.C. § 119(e) of the filing date of U.S. Patent Application No. 62/253,075 entitled PROCESSING LOOPS IN COMPUTATIONAL GRAPHS, which was filed on Nov. 9, 2015, and which is incorporated here by reference.

BACKGROUND

This specification relates to processing computational graphs representing neural networks.

Neural networks are machine learning models that employ one or more layers of models to generate an output, e.g., one or more classifications, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters for the layer.

The layers of a neural network can be processed by an individual device. The device can have a processor that performs operations, e.g., generating outputs at a layer from inputs, and stores outputs from the operations in memory. Due to the large number and size of operations generally required to generate the outputs in the neural network, one device can take a significant amount of time to process the layers of the neural network.

SUMMARY

In general, this specification describes a system for processing computational graphs representing neural networks and other machine learning models. Processing a computational graph in a distributed manner is described in more detail in U.S. patent application Ser. No. 15/337,744, entitled PROCESSING COMPUTATIONAL GRAPHS, filed on Oct. 28, 2016, and U.S. patent application Ser. No. 15/338,225, entitled MODIFYING COMPUTATIONAL GRAPHS, filed on Oct. 28, 2016, the contents of each of which are hereby incorporated by reference herein in their entirety.

Particular embodiments of the subject matter described in this specification can be implemented so as to realize one or more of the following advantages. Operations of a neural network, e.g., operations to generate an inference from an input or to train the neural network, can be represented as a computational graph of nodes and directed edges. A system processes this computational graph representation to efficiently perform the operations of the neural network. By way of illustration, subgraphs of the computational graph can be assigned to unique devices, each of which performs operations in the respective subgraph, to reduce an overall time required to perform operations of the neural network. Particularly, this specification describes techniques for processing control flow statements, such as loops, in computational graphs in a manner which allows operations of loops to be distributed across multiple, different devices. More particularly, such techniques may enable each device participating in the execution of a respective loop to independently determine the current state of recursion or iteration in the respective loop. Such techniques may help to ensure that computational graphs with loops are collectively executed by multiple devices in an efficient manner.

In some aspects, the subject matter described in this specification may be embodied in methods that may include the actions of obtaining data representing a computational graph, the computational graph comprising a plurality of nodes and directed edges, where each node represents a respective operation, and where each directed edge connects a respective first node to a respective second node that represents an operation that receives, as input, an output of an operation represented by the respective first node, obtaining data identifying an allocation of the computational graph across a plurality of devices, where the allocation assigns each node in the computational graph to a respective device of the plurality of devices, identifying one or more sets of nodes in the computational graph that (i) represent a respective control flow statement, (ii) include one or more respective first nodes assigned to a first device that represent one or more respective first operations of the control flow statement that are to be conditionally executed, (iii) include one or more respective second nodes assigned to a second device that represent one or more respective second operations that determine whether or not or how many times the one or more respective first operations are to be recursively or iteratively executed, and for each identified set of nodes, generating a structure of nodes and directed edges that represents an operation that provides, as output, a current state of recursion or iteration in the respective control flow statement, inserting the structure between the one or more respective first nodes and one or more respective second nodes in the computational graph, and modifying the allocation to assign the structure to the respective first device.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For example, generating the structure may include generating the structure based on nodes assigned to the respective second device.

For example, the structure may include one or more nodes that represent the same operations as one or more of the nodes assigned to the respective second device.

For example, the one or more respective second operations represented by the one or more respective second nodes may provide a Boolean value as output. For instance, the Boolean value indicates whether recursion or iteration of the control flow statement is to continue or terminate. In some examples, the methods that may further include the actions of inserting a directed edge between the one or more respective second nodes and the structure that enables the operation represented by the structure to receive, as input, the Boolean value output by the one or more respective second operations represented by the one or more respective second nodes.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for processing loops in a computational graph.

Like reference numbers and designations in the various drawings indicate like elements.

DETAILED DESCRIPTION

Figure 1A:
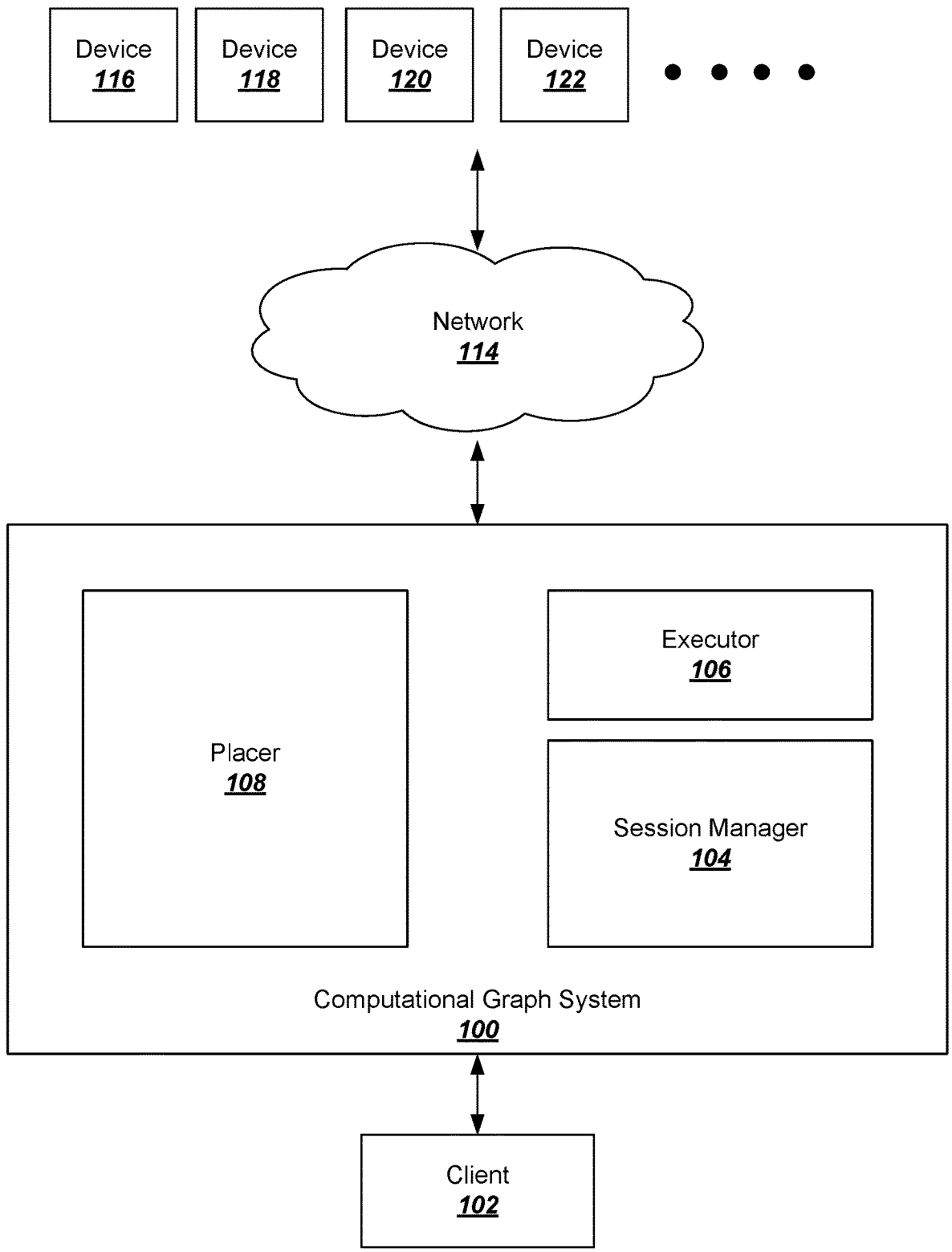
FIG. 1A illustrates an example computational graph system for distributing operations for neural networks represented as computational graphs.

This specification generally describes a computational graph system that performs operations represented by a computational graph in a distributed manner. Particularly, this specification describes techniques for processing control flow statements, such as loops, in computational graphs in a manner which allows operations of loops to be distributed across multiple, different devices. More particularly, such techniques may enable each device participating in the execution of a respective loop to independently determine the current state of recursion or iteration in the respective loop. Such techniques may help to ensure that computational graphs with loops are collectively executed by multiple devices in an efficient manner.

The computational graph includes nodes connected by directed edges. Each node in the computational graph represents an operation. An incoming edge to a node represents a flow of an input into the node, i.e., an input to the operation represented by the node. An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

Generally, the input and outputs flowing along directed edges in the computational graph are tensors. A tensor is a multidimensional array of numeric or other values, e.g., strings, having a specific order that corresponds to the dimensionality of the array. For example, a scalar value is a 0th-order tensor, a vector of numeric values is a 1st-order tensor, and a matrix is a $2^{nd}$-order tensor.

In some implementations, the operations represented in the computational graph are neural network operations or operations for a different kind of machine learning model. A neural network is a machine learning model that employs one or more layers of nonlinear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the network generate an output from a received input in accordance with current values of a respective set of parameters, while other layers of the network may not have parameters.

For example, the operations represented by the computational graph may be operations necessary for the neural network to compute an inference, i.e., to process an input through the layers of the neural network to generate a neural network output for the input. As another example, the operations represented by the computational graph may be operations necessary to train the neural network by performing a neural network training procedure to adjust the values of the parameters of the neural network, e.g., to determine trained values of the parameters from initial values of the parameters. In some cases, e.g., during training of the neural network, the operations represented by the computational graph can include operations performed by multiple replicas of the neural network.

By way of illustration, a neural network layer that receives an input from a previous layer can use a parameter matrix to perform a matrix multiplication between the parameter matrix and the input. In some cases, this matrix multiplication can be represented as multiple nodes in the computational graph. For example, a matrix multiplication can be divided into multiple multiplication and addition operations, and each operation can be represented by a different node in the computational graph. The operation represented by each node can generate a respective output, which flows on a directed edge to a subsequent node. After the operation represented by a final node generates a result of the matrix multiplication, the result flows, on a directed edge, to another node. The result is equivalent to an output of the neural network layer that performs the matrix multiplication.

In some other cases, the matrix multiplication is represented as one node in the graph. The operations represented by the node can receive, as inputs, an input tensor on a first directed edge and a weight tensor, e.g., a parameter matrix, on a second directed edge. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., SoftMax, Sigmoid, rectified linear unit (ReLU), or convolutions.

In some examples, one or more sets of nodes in the computational graph may represent control flow statements, such as loops. The one or more sets of nodes may, for instance, represent a recursive and/or iterative control flow statements including while loops, do-while loops, for loops, for-each loops, or nested control flow statements that include a combination thereof. Such control flow statements may, for example, be represented by a combination of primitive data flow operations that form conditional statements, such as switch and merge, and one or more other operations.

For example, operations that are referenced herein as "Enter," "Leave," and "Iteration Counter" may be included in such a combination so as to leverage conditional statements formed by primitive data flow operations to control recursion or iteration in the execution of one or more other operations. The "Enter" operation may, for instance, serve to create or find a child frame that is uniquely identified by the loop name in the current frame and provide the data that it receives as input to the new child frame. In this context, frames may include instruction templates that are allocated to support loop iterations. In some examples, such frames described herein may include those which are allocated under any conventional dynamic dataflow machine architecture. The "Leave" operation may, for instance, serve to notify the parent frame of the completion of one or more operations. The "Iteration Counter" operation may, for instance, serve to increment a counter that corresponds to the input it receives, which allows different invocations of the same node in a recursion or iteration to be uniquely identified.

Representing a neural network as a computational graph provides for a flexible and granular way to efficiently implement the neural network, especially if the operations for the neural network are distributed across multiple devices with different hardware profiles.

FIG. 1A illustrates an example computational graph system 100 for distributing operations for neural networks represented as computational graphs. The system 100 is an example of a system implemented as computer programs on one or more computers in one or more locations, in which the systems, components, and techniques described below can be implemented.

A user of a client 102 can request operations be performed on a computational graph representing a neural network. The client 102 can be an application running on a computer.

As part of the request, the client 102 provides data identifying a computational graph to the system 100 and specifies types of operations to be performed on the computational graph.

For example, the request can identify a computational graph representing an inference for a particular neural network and can identify an input on which the inference should be performed.

As another example, the request can identify a computational graph representing a training procedure for a particular neural network and can identify an input, such as training data, on which the training should be performed. In this example, when receiving a request to process a computational graph representing a training procedure, the system 100 can determine modified values for parameters for one or more edges of the computational graph, e.g., using conventional backpropagation or other neural network training techniques. The system 100 can store the modified parameters in memory of a device, and an executor 106 can retrieve and store, at the system 100, addresses of the modified weights. Upon further requests from the client 102 for inference, training, or other operations requiring the modified weights, the system 100 can access the modified weights using the addresses.

In some cases, the request may specify a response that should be transmitted in response to the request. For example, for a neural network training request, the client 102 can request an indication that the requested neural network training operations have been completed and, optionally, trained values of the parameters of the neural network or an indication of a memory location from which the trained values can be accessed by the client 102. As another example, for a neural network inference request, the client 102 can request output values that represent an inference operation from one or more particular nodes of the computational graph.

The system 100 performs the operations to generate the particular output by partitioning the operations represented by the computational graph across multiple devices 116-122. The system 100 partitions the operations to the multiple devices 116-122 over a data communication network 114, e.g., local area network (LAN) or wide area network (WAN). The devices 116-122 perform the operations and, if applicable, return a respective output or indication to the system 100, which can return the requested output or indication to the client 102.

Any devices performing neural network operations, e.g., devices 116-122, can include a memory, e.g., a random access memory (RAM), for storing instructions and data and a processor for executing stored instructions. Generally, each device is a hardware resource that performs operations independent of other devices. For example, each device can have its own processing unit. The devices can be Graphical Processing Units (GPUs) or Central Processing Units (CPUs). By way of illustration, one machine can host one or more devices, e.g., multiple CPUs and GPUs. Examples of such devices and machines can be seen in FIG. 1B.

Figure 1B:
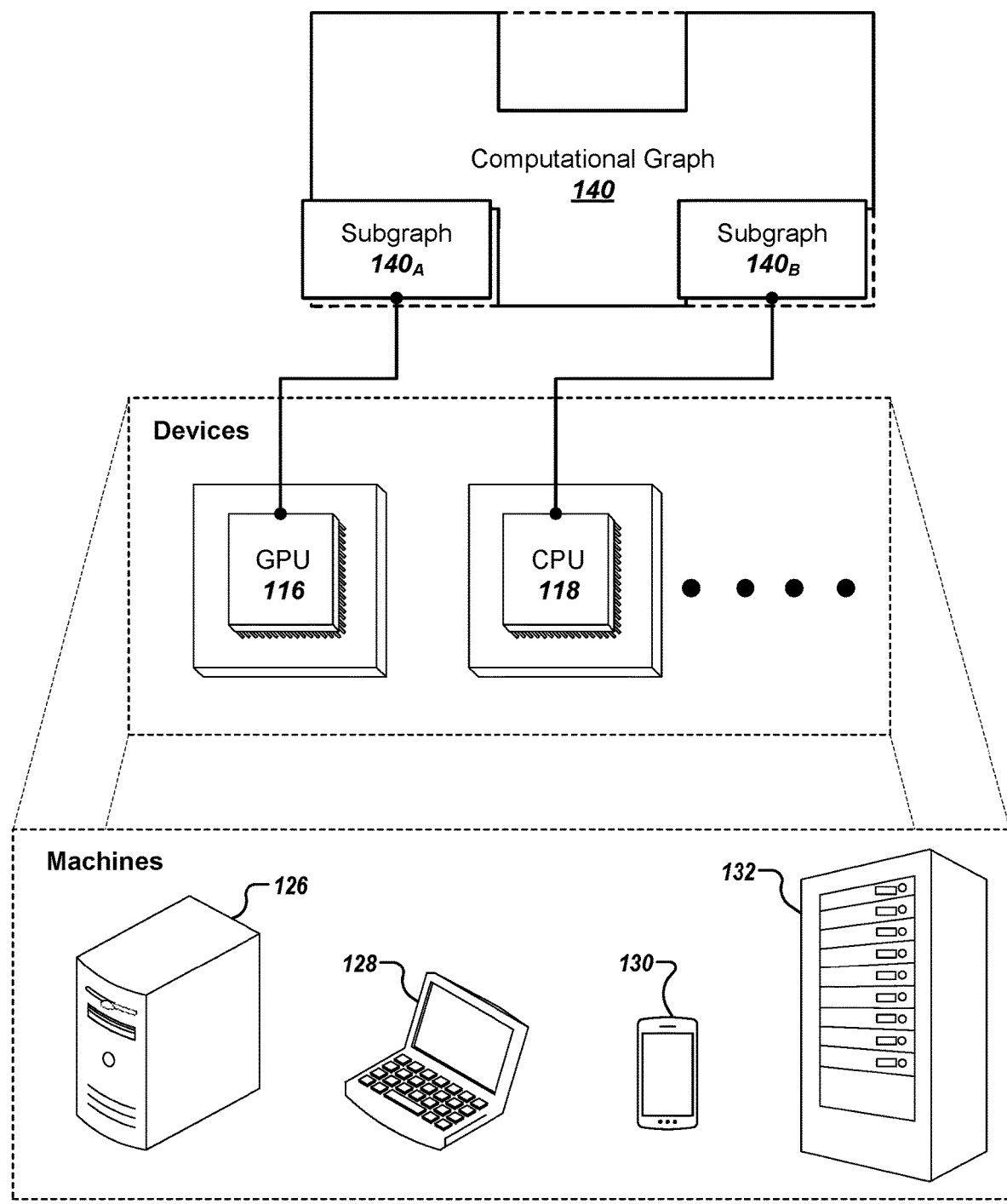
FIG. 1B is a conceptual diagram for an exemplary framework for distributing operations for neural networks represented as computational graphs in a system.

FIG. 1B is a conceptual diagram for an exemplary framework for distributing operations for neural networks represented as computational graphs in the system 100. Referring now to FIG. 1B, examples of machines may include a computing device 126, personal computer 128, mobile device 130, and server 132. Each machine may, for example, include one or more devices, such as GPU 116 and CPU 118.

Each device can also have a respective computational capability. That is, devices can have different amount of memories, processing speed, or other architectural characteristics. Thus, some devices can perform operations that other devices cannot. For example, some operations require a certain amount of memory that only particular devices have, or some devices are configured to only perform a particular type of operation, e.g., inference operations.

Referring again to FIG. 1A, a session manager 104 in the system 100 may receive a request from the client 102 to start a session during which operations of the computational graph are performed. The session manager 104 manages the set of devices, e.g., devices 116-122, that can perform operations of the computational graph, and can provide a placer 108 with the set of devices that are available to perform operations.

The placer 108 determines, for each operation to be performed in the computational graph, a respective target device, e.g., device 116, that performs the operation, and in some implementations, a time for the respective target device to perform the operation. Some operations can be performed in parallel while other operations require prior operations in the computational graph to be completed, e.g., the other operations process, as inputs, outputs of the prior operations.

After the devices perform the operations allocated by the placer 108 to generate outputs, the executor 106 can retrieve the outputs. The executor 106 can generate an appropriate response to the request, e.g., an output or an indication that the processing has been completed. Then, the executor 106 can return the response to the client 102.

The session manager 104 also provides sets of operations to be performed in the computational graph to the executor 106. The executor 106 periodically retrieves runtime statistics from the devices 116-122 related to graph execution of operations. The executor 106 provides the runtime statistics to the placer 108, which can re-optimize placement and scheduling of further operations.

In operation, the system 100 may receive a request from a client 102 to process a computational graph. For example, the request can be a request to perform a neural network inference represented by the computational graph on a specified input, a request to perform neural network training operations represented by the computational graph on a specified set of training data, or a request to perform other neural network operations represented by the computational graph, as described above.

Upon receipt of the request, the system 100 may obtain data representing the computational graph. In some cases, the data is sent with the request from the client. In other cases, the request identifies the computational graph and the system 100 retrieves the data representing the identified graph from memory. By way of illustration, the data representing the graph can be an array of the nodes in the graph. Each node can contain information specifying an operation type, a name, and a list of incoming and outgoing edges to the node.

The system 100 may identify multiple available devices for performing the requested operation. A device may be considered busy if the device is currently performing other operations and cannot be assigned further operations or is otherwise unavailable to perform graph processing operations. The device may be considered available if the device can be assigned further operations, e.g., the further operations can be queued for operation by the device.

The system 100 may partition the computational graph into multiple subgraphs. Each subgraph includes one or more nodes in the computational graph. The system 100 may, in some examples, obtain these subgraphs by breaking up pairs of nodes in the computational graph that are adjacent to each other, but are assigned to different devices.

The system 100 may assign, for each subgraph, the operations represented by the one or more nodes in the subgraph to a respective available device. In some implementations, the system 100 may assign each subgraph to a device having a computational capability necessary to perform the operations represented by the nodes in the subgraph. In some implementations, the request from the client includes data specified by a user that identifies a particular type of device to perform operations for particular nodes.

Thus, the system 100 generates an allocation of the computational graph across multiple devices that assigns each node in the computational graph to a respective device of the multiple devices. Each subgraph includes a given group of one or more nodes in the computational graph which, as described above, may be assigned to the same device. An exemplary subgraph to device mapping can be seen in FIG. 1B. In this example, exemplary subgraphs 140A and 140E of computational graph 140 may be allocated to GPU 116 and CPU 118, respectively. GPU 116 and CPU 118 may reside in a different or a same one of machines 126-132. In operation, GPU 116 and CPU 118 may perform the operations represented by the nodes included in the subgraph that the system 100 has assigned to them.

The system 100 may cause the devices to perform the operations of the nodes included in the subgraphs respectively assigned to the devices. In some implementations, the system 100 may send each device a request to start the operations of the nodes included in the subgraph assigned to the respective device. In response to receiving such a request from the system 100, each device may proceed to perform the operations of the nodes included in the subgraph assigned to the device.

Given that various dependencies may exist between nodes and groups of nodes in the computational graph, it follows that communication between various devices will need to be coordinated in order for such devices to be able to collectively execute the computational graph. For example, a node that represents an operation being executed on a first device may receive, as input, an output of another node that represents an operation being executed on a second, remotely located device. In this example, communication of the output of the operation represented by the other node from the second device to the first device may need to be coordinated in an effective manner in order to ensure proper and timely execution of the computational graph.

The system 100 may modify one or more portions of a computational graph that represent control flow statements. Specifically, the system 100 may generate structures of nodes and directed edges that act as finite state machines that reflects the current state of recursion or iteration in the control flow statements. The system 100 may generate such structures based on nodes that are allocated to the same device as a node that represents an operation that determines whether or not or how many times operations of the control flow statement are to be recursively or iteratively executed, and insert such structures in one or more portions of the computational graph that are allocated to other devices. In this way, devices that are otherwise blind to predicates of control flow statements may be able to remain informed of the current state of recursion or iteration, e.g., continuing or terminating, which allows such devices to determine whether or not to expect to receive input of operations of a control flow statement being executed on other devices.

In some examples, the devices may coordinate exchanges of inputs and outputs with one another, as necessary. In these examples, the communication between the devices may occur independent of the system 100. That is, the system 100 may send each device a request to execute the operations of its respective subgraph and, in response to the request, each device may proceed to execute the operations of its respective subgraph in response to the system 100's request, which may include coordinating communication with other devices without additional intervention by the system 100.

In some implementations, to allow the devices to communicate independently of the system 100, the system 100 modifies the computational graph such that it includes additional nodes that represent communication operations between nodes. In particular, a device's respective subgraph may include a node representing an operation which, when executed by the device, allows the device to seamlessly communicate with another device that is executing a counterpart operation.

More particularly, the system 100 may insert "send" and "receive" nodes into the computational graph. Each send node represents an operation in which data, such as a tensor, is relayed to a receive node that is assigned to a different device than that of the send node. The system 100 may determine the locations in the graph at which to insert pairs of send and receive nodes by identifying any cross-device directed edges in the graph. Cross-device directed edges are directed edges in the computational graph that connect nodes in the computational graph that are to be allocated to two different devices. The system 100 may identify such cross-device directed edges while or after determining the allocation of the computational graph. Upon identifying each cross-device directed edge included in the graph, the system 100 may modify the computational graph by splitting each cross-device directed edge and inserting a pair of send and receive nodes in place of the cross-device directed edge. This modification process is described further below in reference to FIGS. 2A-C.

Figure 2A:
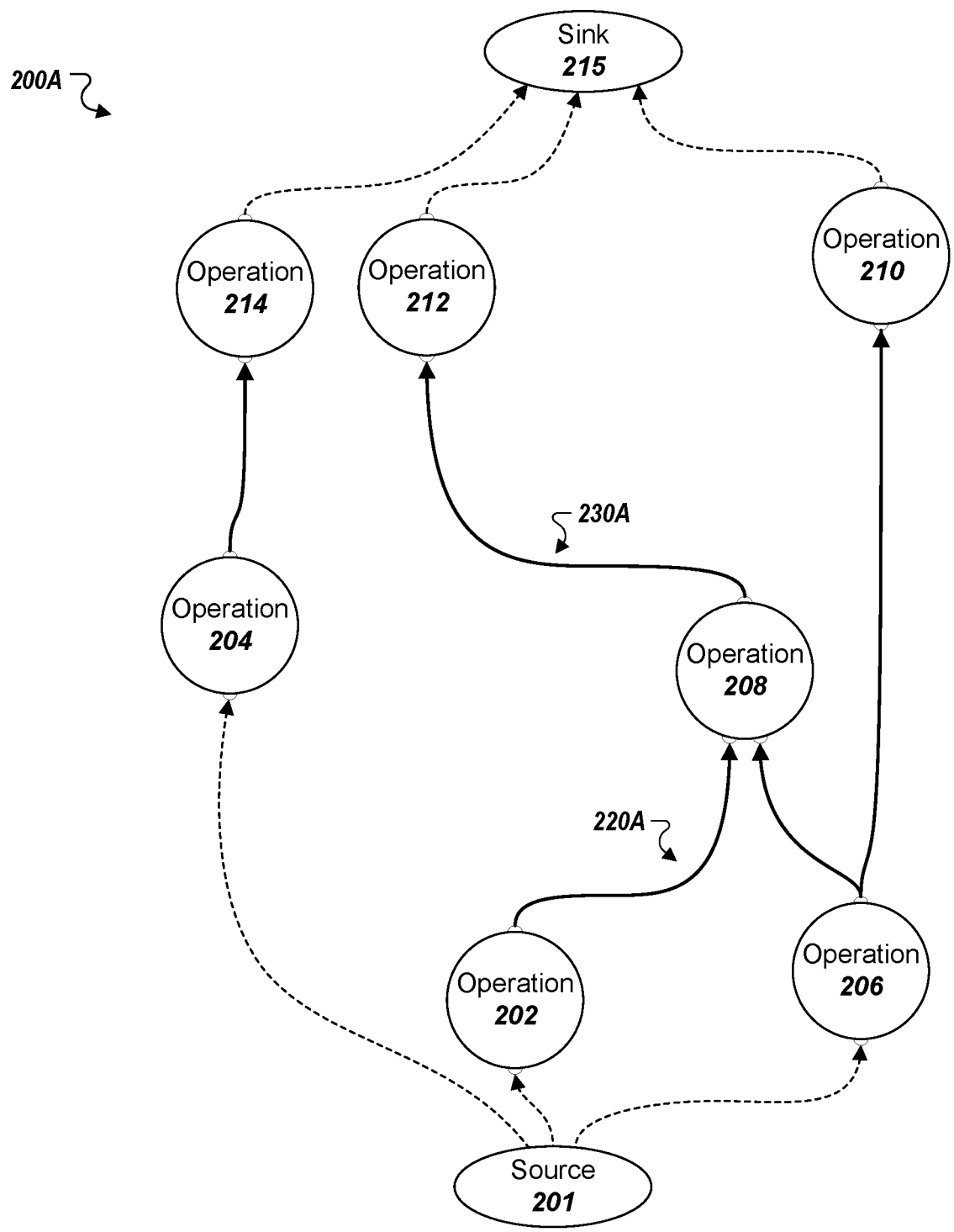
FIGS. 2A-2C and 3A-3C are example computational graphs.
Figure 2B:
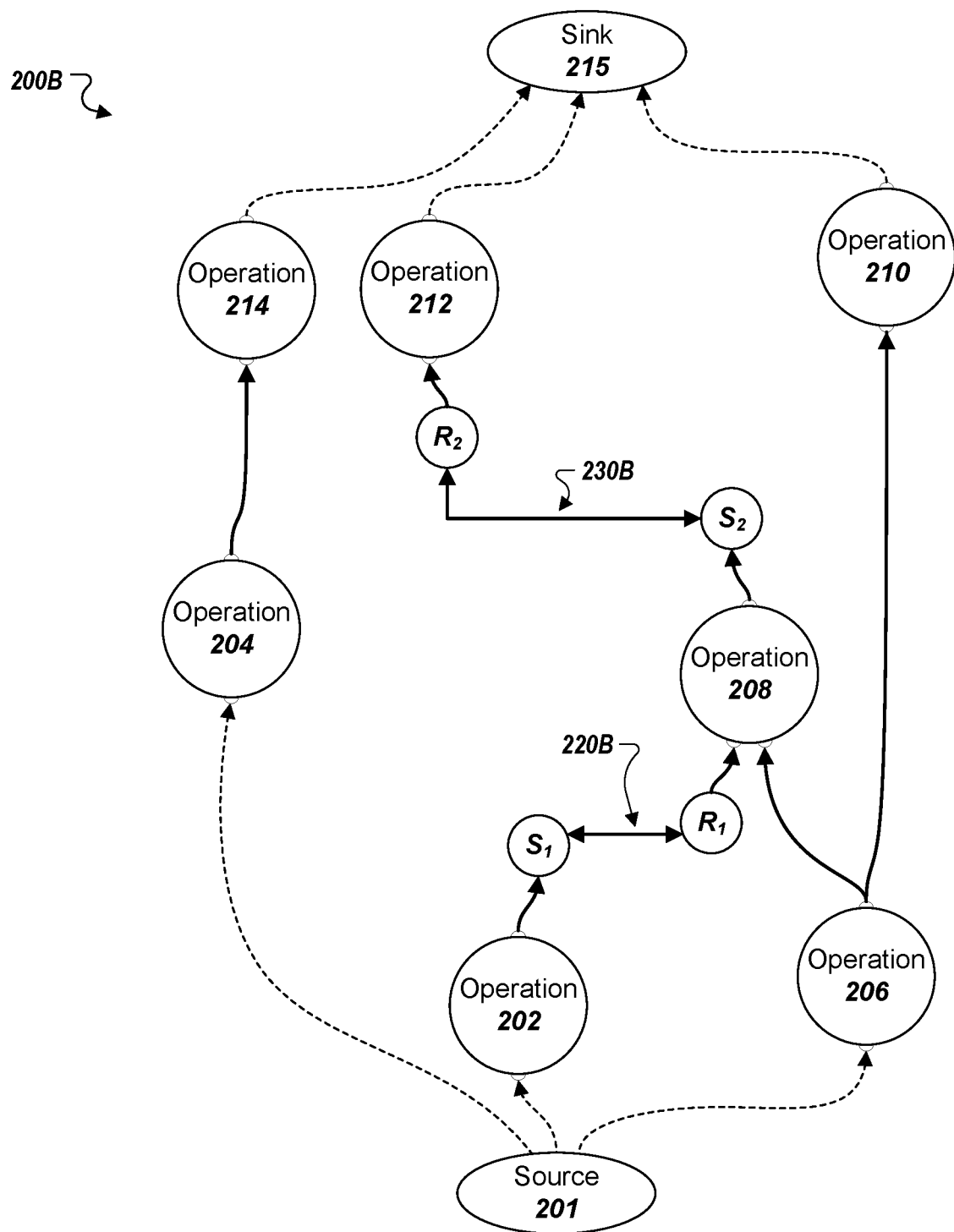
Figure 2C:
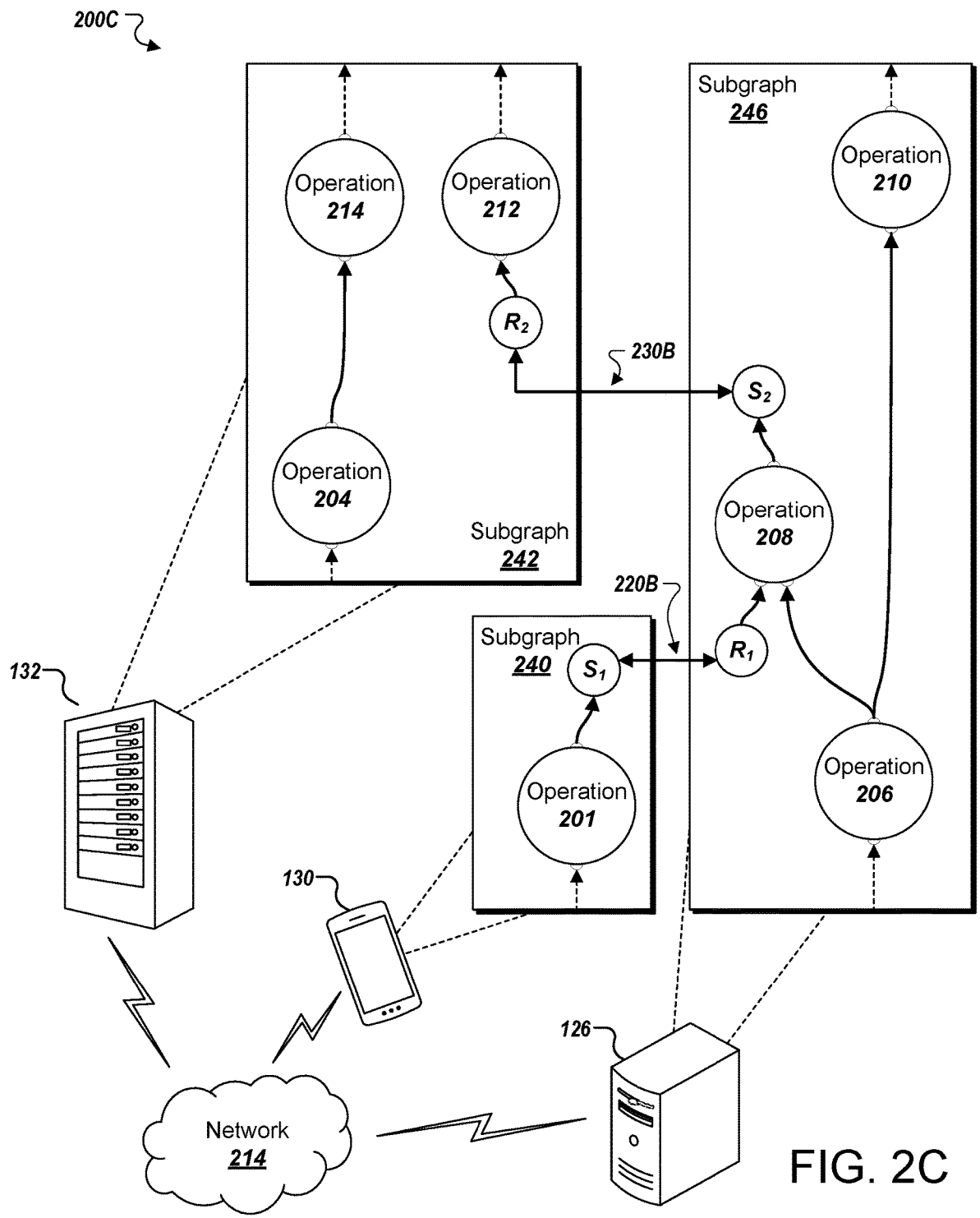

FIGS. 2A-C illustrate example computational graphs. By way of example, a computational graph system, e.g., the system 100 of FIG. 1A, can receive a request from a client to, given a set of inputs, compute an inference using the computational graph 200A. The computational graph 200A may receive input from an exemplary source 201 and provide output to an exemplary sink 215. The exemplary source 201 and sink 215 may, for example, be one or more other nodes of the computational graph.

The system may, for instance, determine to allocate computational graph 200A across three different devices. To make this determination the system may analyze the computational graph 200A to identify one or more nodes that can be partitioned into subgraphs and allocated to the devices available. For example, the system may determine to allocate a first chain formed by nodes 204 and 214 to a first device, a second chain formed by nodes 206, 208, and 210 to a second device, and node 201 to a third device. Although other possible chains of nodes are possible, the system can select the chains that minimize the number of subgraphs.

Under this particular allocation, the system may identify directed edges 220A and 230A as being cross-device directed edges. That is, the system may recognize that directed edges 220A and 230A each connect nodes that the system has determined to allocate to different devices. For example, it can be seen that directed edge 220A connects node 202 to node 208, which the system has determined to allocate to third and second devices, respectively. Similarly, directed edge 230A crosses device boundaries by extending from node 208, which corresponds to the second device, to node 212, which corresponds to the first device.

In response to identifying each cross-device directed edge included in computational graph 200A, the system may proceed to modify the computational graph 200A to generate a modified computational graph, e.g., the modified computational graph 200B illustrated in FIG. 2B. More particularly, the system may insert a pair of send and receive nodes between nodes 202 and 208 in place of directed edge 220A. In similar fashion, the system may also insert a pair of send and receive nodes between nodes 208 and 212 in place of directed edge 230A. It can be seen that directed edges are also inserted between each send or receive node and each node adjacent to such send or receive node.

Referring now to FIG. 2B, it can be seen that modified computational graph 200B, which represents a version of the computational graph 200A as modified by the system, includes a two pairs of send and receive nodes. Specifically, a first send node, $S_1$ has been inserted between nodes 202 and 208, and a corresponding first receive node, $R_1$ has been inserted between the first send node $S_1$ and node 208. By these insertions, the system allocates the first send node $S_1$ to the same device as node 202 (i.e., the third device) and allocates the first receive node $R_1$ to the same device as node 208 (i.e., the second device). A bidirectional bridge 220B connects the first send node $S_1$ to the first receive node $R_1$. The bridge 220B can be seen as representing a communication channel between the first send node $S_1$ and the first receive node $R_1$.

When executed, the operations represented by the first send node $S_1$ and the first receive node $R_1$ enable the second and third devices to communicate in a predetermined manner. For example, execution of such operations may include the second and third devices adhering to a particular communication protocol. Address information of each respective device and/or node being executed by each respective device may also be built into these operations. In this way, the first send node $S_1$ and the first receive node $R_1$ may encapsulate every communication process that may need to be performed between the second and third devices in order for their respective subgraphs to be satisfactorily executed. These communication processes are described further below in reference to FIGS. 3 and 4A-B.

Similarly, a second send node, $S_2$ has been inserted between nodes 208 and 212, and a corresponding second receive node, $R_2$ has been inserted between the second send node $S_2$ and node 212. By these insertions, the system allocates the second send node $S_2$ to the same device as node 208 (i.e., the second device) and allocates the first receive node $R_1$ to the same device as node 208 (i.e., the first device). A bidirectional bridge 230B connects the second send node $S_2$ to the second receive node $R_2$, and can be can be seen as representing a communication channel between the second send node $S_2$ and the second receive node $R_2$. Much like the first send node $S_1$ and the first receive node $R_1$, the second send node $S_2$ and the second receive node $R_2$ enable communication to be easily coordinated between the second and first devices.

As demonstrated by the modified computational graph 200C in FIG. 2C, the system 100 may modify the allocation such that each send node is allocated to one respective subgraph and each receive node is allocated to another respective subgraph. For instance, the first send node $S_1$ may be allocated to third device included in machine 130, along with node 201, as part of subgraph 240 that the system has assigned to the third device. Similarly, the first receive node $R_1$ and second send node $S_2$ may be allocated to the second device included in machine 126, along with nodes 206, 208, and 210, as part of subgraph 246 that the system has assigned to the second device. Furthermore, the second receive node $R_2$ may be allocated to the first device included in machine 132, along with nodes 206, 208, and 210, as part of subgraph 246 that the system has assigned to the first device.

At execution time, the operation represented by the first send node $S_1$ may include a relaying of the output of node 201 to the first receive node $R_1$. This exchange may occur, for example, by way of channel 220B over a network 214 to which machines 130 and 126 have access. Network 214 may be similar to network 114 as described above in association with FIG. 1. The protocol leveraged to conduct this communication may be reflected in the operations represented by the first pair of send and receive nodes $S_1$ and $R_1$, and may depend on one or more characteristics of the devices, machines, nodes, and networks associated with the execution of subgraphs 240 and 246. The operation represented by the first receive node $R_1$ may, in turn, include a passing of the output of the operation represented by node 201 that it receives from the first send node $S_1$ along as an input to node 208.

Similarly, the operation represented by the second send node $S_2$ may include a relaying of the output of the operation represented by the node 208 to the second receive node $R_2$. This exchange may occur, for example, by way of channel 230B over the network 214 to which machines 132 and 126 have access. The protocol leveraged to conduct this communication may be reflected in the operations represented by the second pair of send and receive nodes $S_2$ and $R_2$, and may depend on one or more characteristics of the devices, machines, nodes, and networks associated with the execution of subgraphs 246 and 242. The operation represented by the second receive node $R_2$ may, in turn, include a passing of the output of the operation represented by the node 208 that it receives from the second send node $S_2$ along as an input to node 212.

Figure 3A:
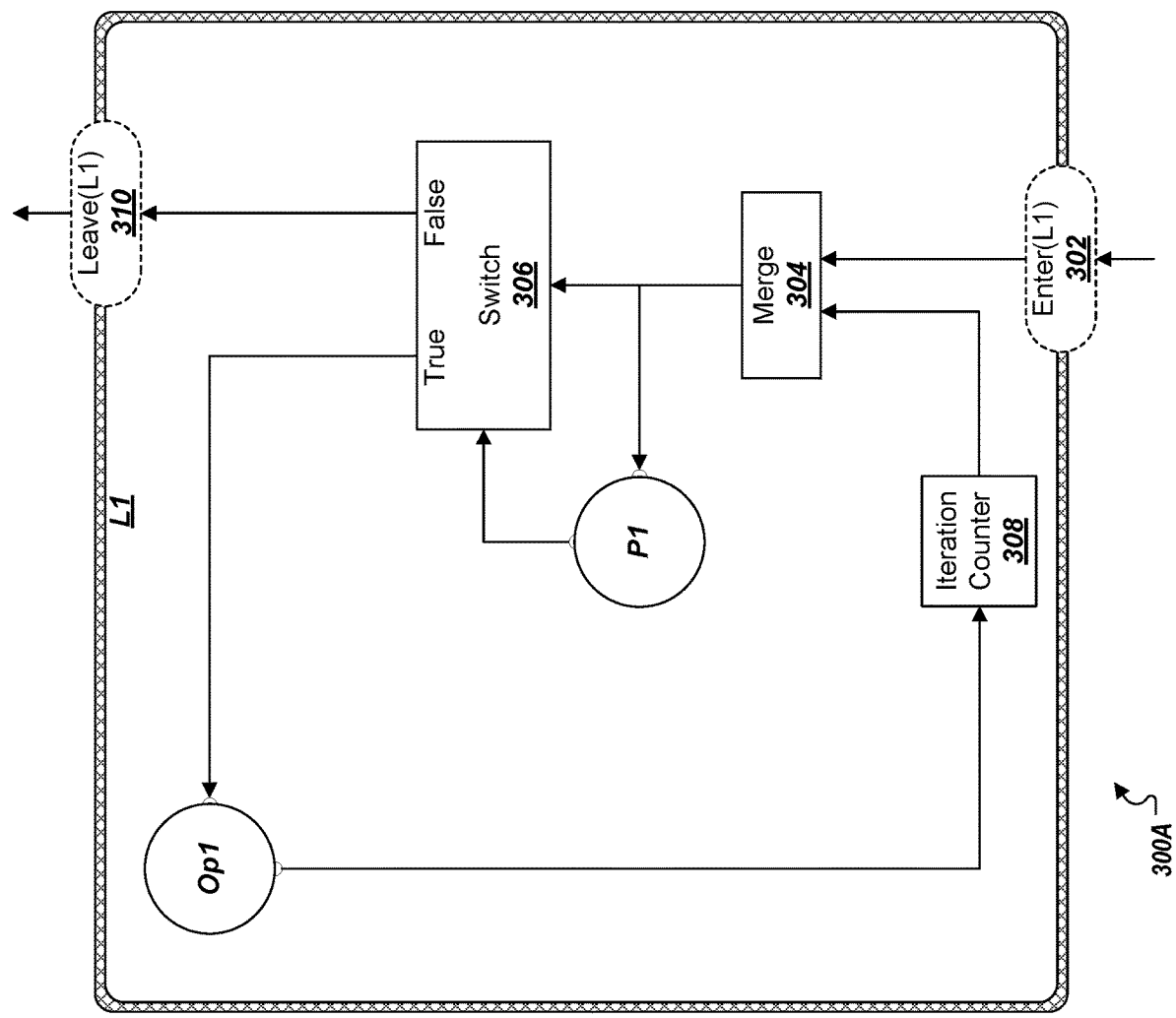
Figure 3B:
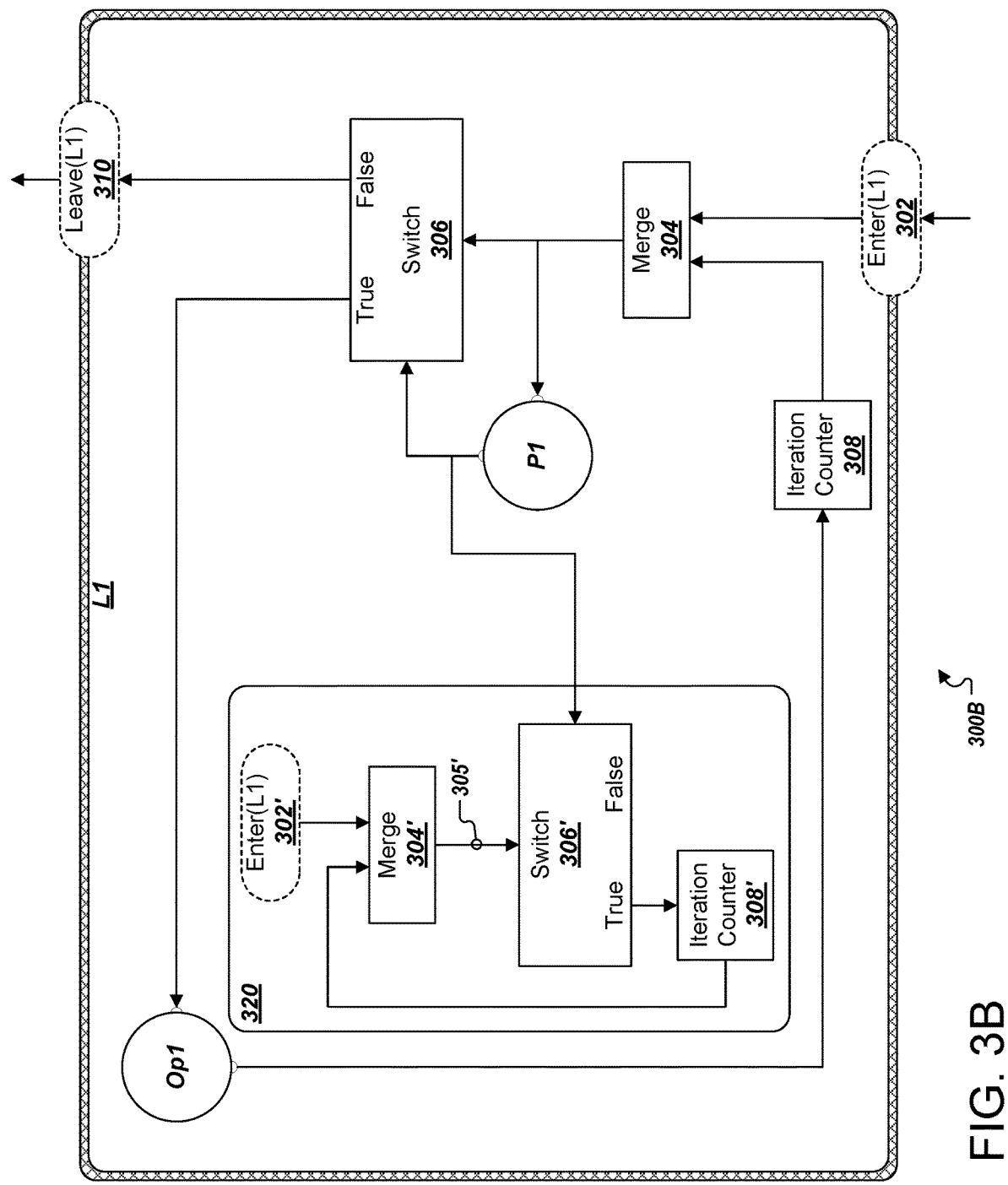
Figure 3C:
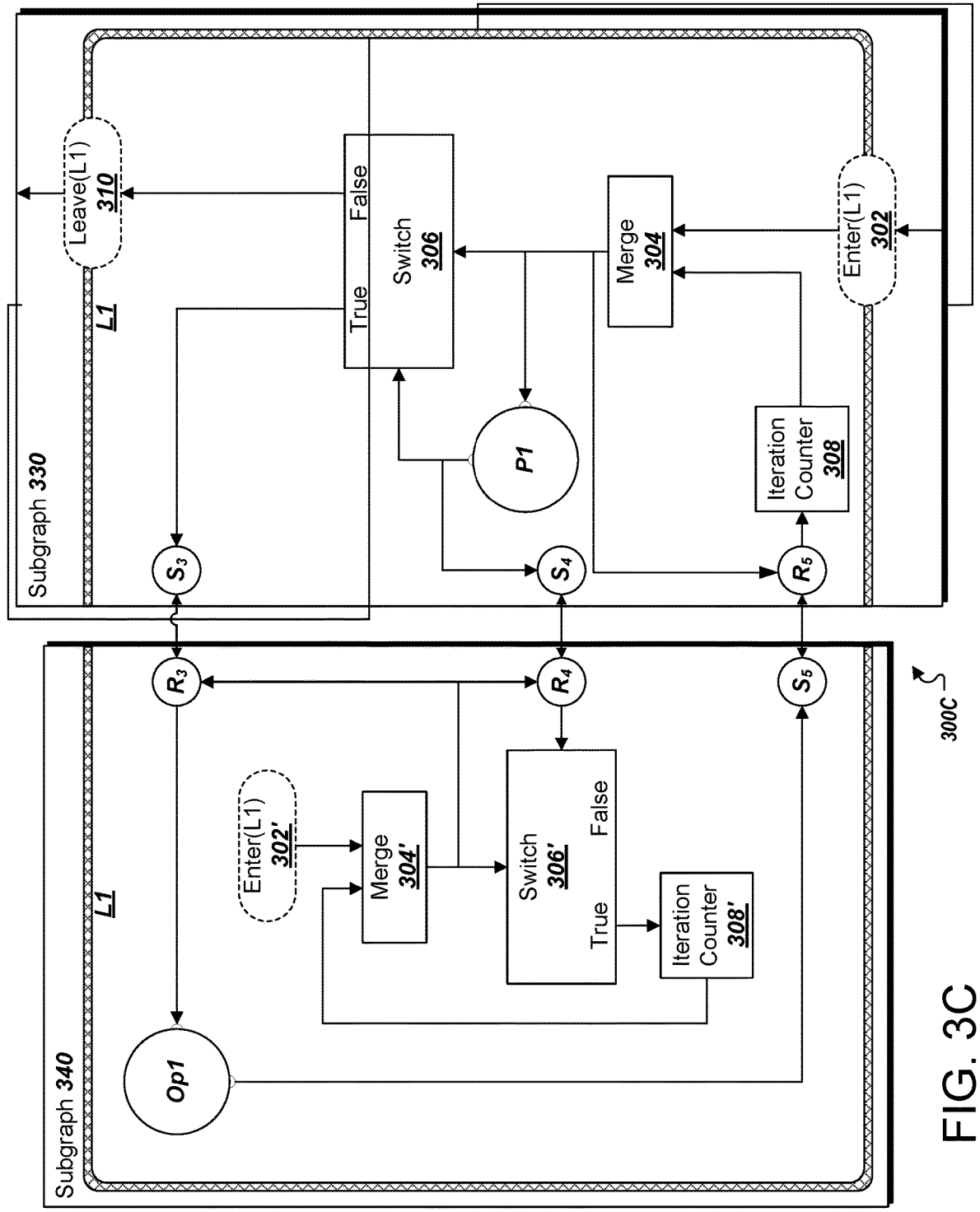

FIGS. 3A-C illustrate example computational graphs. By way of example, a computational graph system, e.g., the system 100 of FIG. 1A, can receive a request from a client to, given a set of inputs, compute an inference using the computational graph 300A. The computational graph 300A includes multiple nodes that represent a control flow statement L1. In this example, the control flow statement L1 may be that of a while loop.

More particularly, the nodes in computational graph 300A that represent the control flow statement L1 include Enter (L1) node 302, merge node 304, node P1, switch node 306, node Op1, iteration counter node 308, and Leave(L1) node 310. Merge node 304 and switch node 306 may represent the primitive operations of merge and switch, respectively. As mentioned above, these primitive operations may be implemented in combination to form a conditional statement.

In this example, it can be seen that the output of the merge operation represented by merge node 304 is provided as input to both the operation represented by node P1 and the switch operation represented by switch node 306. The switch operation represented by switch node 306 may forward the input that it receives from the merge operation represented by merge node 304 depending on a Boolean value that the operation represented by node P1 provides as input to the switch operation represented by switch node 306. More particularly, the switch operation represented by switch node 306 may forward the input that it receives from the merge operation represented by merge node 304 to the operation represented by node Op1 if the Boolean value output by the operation represented by node P1 is true. In this way, the operations represented by merge node 304, node P1, switch node 306, and node Op1 form an if-then conditional statement.

More specifically, the conditional statement represented by these operations of control flow statement L1 allows for the operation represented by node Op1 to be executed upon the output of the merge operation represented by merge node 304 if, and only if, the operation represented by node P1 produces a true Boolean value. In the event that the operation represented by node P1 produces a false Boolean value, the switch operation represented by switch node 306 will not provide the input that it receives from the merge operation represented by merge node 304 as output on the directed edge that connects to node Op1, but rather will provide the input that it receives from the merge operation represented by merge node 304 as output on a different directed edge that does not connect to node Op1.

The operations represented by Enter(L1) node 302, Iteration Counter node 308, and Leave(L1) node 310 may represent Enter, Iteration Counter, and Leave operations, respectively. As mentioned above, these operations may be implemented in combination with a conditional statement to form recursive and/or iterative control flow statements, such as loops. In this example, the operations represented by Enter(L1) node 302, Iteration Counter node 308, and Leave (L1) node 310 can be seen as enabling iterative execution of the conditional statement formed by the operations represented by merge node 304, node P1, switch node 306, and node Op1 as described above. More specifically, the Enter operation represented by node 302 may receive input from operations represented by one or more upstream nodes and, on the basis of such, create or find the frame corresponding to control flow statement L1. Such upstream nodes may, for instance, be included in a parent frame of control flow statement L1. It can be seen that the Enter operation represented by node 302 further provides input to the merge operation represented by merge node 304, which may include the input received from operations represented by one or more upstream nodes and contextual information for control flow statement L1. In some examples, such contextual information may include a tag or token that is appended to outputs of some or all of the multiple nodes that represent control flow statement L1.

The Iteration Counter operation represented by node 308 may receive, as input, output of the operation represented by node Op1. In some examples, the Iteration Counter operation represented by node 308 may serve to increment a counter of the inputs that it receives from the operation represented by node Op1. In this way, it can be seen that the Iteration Counter operation represented by node 308 may be able to keep track of the number of times the operation represented by node Op1 has been iteratively executed. In addition, the Iteration Counter operation represented by node 308 may update or otherwise replace the contextual information originally provided by the Enter operation represented by node 302 to reflect the current number of iterations of control flow statement L1 that have occurred as indicated by the counter that it maintains. The Iteration Counter operation represented by node 308 may, for instance, provide the output of the operation represented by node Op1 and/or the updated contextual information as input to the merge operation represented by merge node 304. By this feedback loop, it can be seen that the operation represented by node Op1 will continue to iteratively execute while the Boolean value produced by the operation represented by node P1 remains true. The operation represented by node P1 may, for instance, eventually produce a Boolean value that is false in response to one or more of the output provided by the operation represented by node Op1 and the updated contextual information.

Upon producing a false Boolean value, the switch operation represented by switch node 306 may provide the output of the merge operation represented by merge node 304 as input to the Leave operation represented by node 310. The Leave operation represented by node 310 may, in turn, notify a parent frame of the control flow statement L1 that execution of the operations that represent control flow statement L1 is complete. Furthermore, the Leave operation represented by node 310 may make the input that it receives available to operations represented by one or more downstream nodes. Such downstream nodes may, for instance, be included in the parent frame of control flow statement L1. In this way, the results of the execution of control flow statement L1 may be provided as input to other operations. In examples in which control flow statement L1 is a nested loop of one or more of its parent frames, the operations that represent control flow statement L1 may be executed again once additional input is provided to the Enter operation represented by node 302.

Consider an example in which operations that represent the control flow statement L1 are assigned to different devices according to an allocation of computational graph 300A. For instance, the node Op1 may be allocated to a first device, while the other nodes shown in FIG. 3A are allocated to a second, different device. In such a situation, the operation represented by node Op1 may not receive indication that execution of the control flow statement L1 has ended. As a result, the first device may continue to wait for input from the second device indefinitely. To address this issue, a structure of nodes and directed edges may be generated and allocated to the first device so as to allow the first device to be informed of the current state of recursion or iteration in the control flow statement L1.

Referring now to FIG. 3B, the computational graph 300A may be modified to reflect computational graph 300B which includes a structure 320. The structure 320 may include an Enter(L1) node 302', a merge node 304', a switch node 306', and an Iteration Counter node 308'. The nodes included in structure 320 may represent the same operations as those which are included in control flow statement L1 and assigned to the second device. It can be seen that the structure 320 receives, as input, output of the operation represented by node P1. In this way, an output 305' of the merge operation represented by the merge node 304' may indicate the current state of recursion or iteration in the control flow statement L1. For this reason, the structure 320 can be seen as a finite state machine that allows the first device to remain informed on the execution of the control flow statement L1. Such finite state machines may serve to aggregate information about the execution, send such information to peer devices, and make decisions on loop iteration and termination.

Referring now to FIG. 3C, the computational graph 300B may be modified to reflect computational graph 300C which includes send nodes $S_3$, $S_4$, and $S_5$, and receive nodes $R_3$, $R_4$, and $R_5$. Such send and receive nodes may, for instance, be obtained and inserted using any of the techniques described above. It can be seen that, with send and receive nodes added, computational graph 300C may be effectively partitioned into subgraphs 330 and 340. It can be seen that output 305' is provided as input to the operations represented by receive nodes $R_3$ and $R_4$. Since the operations represented by these receive nodes provide input to the operations represented by node Op1 and switch node 306', and thereby provide receive operations for the first device, it follows that the first device may remained informed of the current state of recursion or iteration in the control flow statement L1. In this way, execution of subgraph 340 may be appropriately discontinued responsive to the operation represented by node P1 producing a false Boolean value. This allows each device involved in the execution of computational graph 300C to independently make determinations regarding recursions and iterations of control flow statement L1.

FIG. 4 is a flow diagram of an example process 400 for processing control flow statements, such as loops, in a computational graph. For convenience, the process 400 will be described as being performed by a system of one or more computers located in one or more locations. For example, a computational graph system, e.g., the computational graph system 100 of FIG. 1A, appropriately programmed, can perform the process 400. The process 400 may, for example, reflect one or more of the processes described above in association with FIGS. 3A-C. Certain novel aspects of the subject matter of this specification are set forth in the claims below.

The system may obtain data representing a computational graph comprising a plurality of node and directed edges (402). For example, a computational graph may be obtained by a computational graph system after a receiving a request from one or more client devices. In some examples, each node in the computational graph is an instantiation of an operation.

The system may obtain data identifying an allocation of the computational graph across a plurality of devices (404). For example, a computational graph system may determine how each node included in the obtained computational graph is to be assigned across multiple available devices. In some implementations, this may include obtaining data identifying an allocation of the computational graph across hardware resources included in one or more machines.

The system may identify sets of nodes that represent control flow statements and include (i) first nodes that represent conditionally executed operations, and (ii) second nodes assigned to another device that represent operations that control execution of first node operations (406). This may, for instance, correspond to the system identifying (i) node Op1 and (ii) other nodes in control flow statement L1.

The system may generate a structure of nodes and directed edges that represents an operation that provides, as output, a current state of recursion or iteration in the control flow statement (408). This may, for instance, correspond to the system generating the structure 320.

The system may insert the structure between the one or more first nodes and one or more second nodes (410). This may, for instance, correspond to the system inserting structure 320 between the node Op1 and the other nodes of control flow statement L1.

The system may modify the allocation to assign the structure to the same device as the one or more first nodes (412). This may, for instance, correspond to the system assigning the structure 320 to the same device as node Op1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
obtaining data representing a computational graph, the computational graph comprising a plurality of nodes and directed edges, wherein each node represents a respective operation, and wherein each directed edge connects a respective first node to a respective second node that represents an operation that receives, as input, an output of an operation represented by the respective first node;

obtaining data identifying an allocation of the computational graph across a plurality of devices, wherein the allocation assigns each node in the computational graph to a respective device of the plurality of devices;

identifying a set of nodes in the computational graph that:
(i) represents a control flow statement,
(ii) includes one or more first nodes assigned to a first device that represent one or more first operations of the control flow statement that are to be conditionally executed, and
(iii) includes one or more second nodes assigned to a second device that represent one or more second operations that determine how many times the one or more first operations are to be recursively or iteratively executed;

generating a control flow state structure of nodes and directed edges, wherein generating the control flow state structure comprises:
generating nodes representing the one or more second operations that determine how many times the one or more first operations are to be recursively or iteratively executed, and that are assigned to the second device, and
adding the nodes into the control flow state structure;

inserting the control flow state structure between the one or more first nodes and the one or more second nodes in the computational graph; and modifying the allocation to assign the one or more first nodes and the control flow state structure to the first device while still assigning the one or more second nodes that represent the one or more second operations to the second device.

2. The method of claim 1, wherein the one or more second operations represented by the one or more second nodes provide a Boolean value as output.

3. The method of claim 2, wherein the Boolean value indicates whether recursion or iteration of the control flow statement is to continue or terminate.

4. The method of claim 2, further comprising:
inserting a directed edge between the one or more second nodes and the control flow state structure that enables the operations represented by the nodes of the control flow state structure to receive, as input, the Boolean value output by the one or more second operations represented by the one or more second nodes.

5. The method of claim 1, further comprising:
executing the computational graph across the plurality of devices, wherein as a consequence of executing the computational graph, the first device and the second device independently perform the one or more second operations.

6. A system comprising:
one or more computers; and
one or more storage devices storing instructions that are operable, when executed by the one or more computers, to cause the one or more computers to perform operations comprising:
obtaining data representing a computational graph, the computational graph comprising a plurality of nodes and directed edges, wherein each node represents a respective operation, and wherein each directed edge connects a respective first node to a respective second node that represents an operation that receives, as input, an output of an operation represented by the respective first node;
obtaining data identifying an allocation of the computational graph across a plurality of devices, wherein the allocation assigns each node in the computational graph to a respective device of the plurality of devices;

identifying a set of nodes in the computational graph that:
(i) represents a control flow statement,
(ii) includes one or more first nodes assigned to a first device that represent one or more first operations of the control flow statement that are to be conditionally executed, and
(iii) includes one or more second nodes assigned to a second device that represent one or more second operations that determine how many times the one or more first operations are to be recursively or iteratively executed;

generating a control flow state structure of nodes and directed edges, wherein generating the control flow state structure comprises:
generating nodes representing the one or more second operations that determine how many times the one or more first operations are to be recursively or iteratively executed, and that are assigned to the second device, and
adding the nodes into the control flow state structure;

inserting the control flow state structure between the one or more first nodes and the one or more second nodes in the computational graph; and modifying the allocation to assign the one or more first nodes and the control flow state structure to the first device while still assigning the one or more second nodes that represent the one or more second operations to the second device.

7. The system of claim 6, wherein the one or more second operations represented by the one or more second nodes provide a Boolean value as output.

8. The system of claim 6, wherein a Boolean value indicates whether recursion or iteration of the control flow statement is to continue or terminate.

9. The system of claim 6, the operations further comprising:
inserting a directed edge between the one or more second nodes and the control flow state structure that enables the operations represented by the nodes of the control flow state structure to receive, as input, the Boolean value output by the one or more second operations represented by the one or more second nodes.

10. The system of claim 6, wherein the operations further comprise:
executing the computational graph across the plurality of devices, wherein as a consequence of executing the computational graph, the first device and the second device independently perform the one or more second operations.

11. A non-transitory computer-readable storage medium comprising instructions stored thereon that are executable by a processing device and upon such execution cause the processing device to perform operations comprising:
obtaining data representing a computational graph, the computational graph comprising a plurality of nodes and directed edges, wherein each node represents a respective operation, and wherein each directed edge connects a respective first node to a respective second node that represents an operation that receives, as input, an output of an operation represented by the respective first node;
obtaining data identifying an allocation of the computational graph across a plurality of devices, wherein the allocation assigns each node in the computational graph to a respective device of the plurality of devices;
identifying a set of nodes in the computational graph that:
(i) represents a control flow statement,
(ii) includes one or more first nodes assigned to a first device that represent one or more first operations of the control flow statement that are to be conditionally executed, and
(iii) includes one or more second nodes assigned to a second device that represent one or more second operations that determine how many times the one or more first operations are to be recursively or iteratively executed;
generating a control flow state structure of nodes and directed edges, wherein generating the control flow state structure comprises:
generating nodes representing the one or more second operations that determine how many times the one or more first operations are to be recursively or iteratively executed, and that are assigned to the second device, and
adding the nodes into the control flow state structure;
inserting the control flow state structure between the one or more first nodes and the one or more second nodes in the computational graph; and
modifying the allocation to assign the one or more first nodes and the control flow state structure to the first device while still assigning the one or more second nodes that represent the one or more second operations to the second device.

12. The non-transitory computer readable storage medium of claim 11, wherein the one or more second operations represented by the one or more respective second nodes provide a Boolean value as output.

13. The non-transitory computer readable storage medium of claim 11, wherein a Boolean value indicates whether recursion or iteration of the control flow statement is to continue or terminate.

14. The non-transitory computer readable storage medium of claim 11, the operations further comprising:
inserting a directed edge between the one or more second nodes and the control flow state structure that enables the operations represented by the nodes of the control flow state structure to receive, as input, the Boolean value output by the one or more second operations represented by the one or more second nodes.

15. The non-transitory computer readable storage medium of claim 11, wherein the operations further comprise:
executing the computational graph across the plurality of devices, wherein as a consequence of executing the computational graph, the first device and the second device independently perform the one or more second operations.

* * * * *

UNITED STATES PATENT AND TRADEMARK OFFICE
CERTIFICATE OF CORRECTION

| | | |
|---|---|---|
| PATENT NO. | : 10,769,521 B1 | Page 1 of 1 |
| APPLICATION NO. | : 15/346626 | |
| DATED | : September 8, 2020 | |
| INVENTOR(S) | : Yu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*